(12) United States Patent
Wilbourn et al.

(10) Patent No.: US 8,702,481 B1
(45) Date of Patent: Apr. 22, 2014

(54) VEHICLE AIR WALL

(75) Inventors: James D. Wilbourn, Grand Prairie, TX (US); Mark A. Nation, Quinlan, TX (US)

(73) Assignee: Danhard, Inc., Dallas, TX (US)

( * ) Notice: Subject to any disclaimer, the term of this patent is extended or adjusted under 35 U.S.C. 154(b) by 511 days.

(21) Appl. No.: 12/387,227

(22) Filed: Apr. 29, 2009

Related U.S. Application Data

(63) Continuation-in-part of application No. 12/148,680, filed on Apr. 21, 2008.

(60) Provisional application No. 60/913,304, filed on Apr. 23, 2007.

(51) Int. Cl.
*B60H 1/24* (2006.01)
*B60J 9/04* (2006.01)

(52) U.S. Cl.
USPC .................................. 454/96; 454/69; 296/19

(58) Field of Classification Search
USPC ......................................... 454/69, 96; 296/19
See application file for complete search history.

(56) References Cited

U.S. PATENT DOCUMENTS

| | | | | |
|---|---|---|---|---|
| 1,584,275 A | * | 5/1926 | Chalkley | 105/1.2 |
| 2,398,894 A | * | 4/1946 | Schofield | 454/138 |
| 3,190,207 A | | 6/1965 | Weisz | |
| 3,211,077 A | * | 10/1965 | Kramer, Jr. | 454/190 |
| 3,327,935 A | * | 6/1967 | Berlant | 454/192 |
| 3,362,469 A | * | 1/1968 | Berner et al. | 165/122 |
| 3,415,113 A | * | 12/1968 | Cline | 73/114.69 |
| 3,491,676 A | * | 1/1970 | Henson | 454/190 |
| 3,527,152 A | * | 9/1970 | McGowan et al. | 454/95 |
| 3,715,968 A | * | 2/1973 | Henson | 454/188 |
| 4,039,091 A | * | 8/1977 | Adamski et al. | 414/556 |
| 4,056,921 A | * | 11/1977 | Gilliand et al. | 53/167 |
| 4,123,967 A | * | 11/1978 | Shanis | 454/190 |
| 4,272,015 A | * | 6/1981 | Houser | 236/49.3 |
| 4,273,217 A | * | 6/1981 | Kajita | 414/556 |
| 4,427,427 A | * | 1/1984 | DeVecchi | 55/358 |
| 4,450,755 A | * | 5/1984 | Catan | 454/188 |
| 4,637,297 A | * | 1/1987 | Anneken | 454/146 |
| 4,783,109 A | | 11/1988 | Bucalo | |
| 4,785,227 A | * | 11/1988 | Griffin | 322/1 |
| 5,072,658 A | * | 12/1991 | Bogage | 454/188 |
| 5,113,749 A | * | 5/1992 | Perbix | 454/193 |
| 5,187,945 A | | 2/1993 | Dixon | |
| 5,236,390 A | * | 8/1993 | Young | 454/95 |
| 5,511,513 A | * | 4/1996 | Baron et al. | 119/163 |
| 5,716,269 A | | 2/1998 | Garbooshian | |

(Continued)

FOREIGN PATENT DOCUMENTS

| | | | | |
|---|---|---|---|---|
| JP | 2003127748 A | * | 5/2003 | B60P 1/44 |
| JP | 2004225983 A | * | 8/2004 | |

*Primary Examiner* — Steven B McAllister
*Assistant Examiner* — Frances H Kamps
(74) *Attorney, Agent, or Firm* — Law Office of William Gustavson, PC

(57) ABSTRACT

A device (10) is used to maintain climate conditions within an interior space (12) of a vehicle such as an ambulance (14). The device (10) includes a blower (18) to generate an air flow and a mounting plate (20) cooperating with a cover (29) to direct the air flow across an opening (16) into the interior space to form a wall of air to prevent loss of the climate conditioned air within the interior space. The vehicle could also be a food service truck, a people transport bus and a boat.

11 Claims, 5 Drawing Sheets

(56) References Cited

U.S. PATENT DOCUMENTS

| | | | |
|---|---|---|---|
| 5,761,908 A * | 6/1998 | Oas et al. | 62/3.2 |
| 5,765,635 A * | 6/1998 | Rhee | 165/203 |
| 6,039,377 A | 3/2000 | Eberspacher | |
| 6,082,799 A * | 7/2000 | Marek | 296/24.38 |
| 6,234,892 B1 * | 5/2001 | Geyer et al. | 454/188 |
| 6,442,957 B1 * | 9/2002 | Voogt et al. | 62/239 |
| 6,470,698 B2 | 10/2002 | Nishi et al. | |
| 6,698,220 B2 * | 3/2004 | Yoneno et al. | 62/184 |
| 6,746,394 B2 | 6/2004 | Donnelly et al. | |
| 6,778,078 B1 * | 8/2004 | Han et al. | 340/474 |
| 6,960,129 B2 | 11/2005 | Ashley et al. | |
| 7,158,863 B1 * | 1/2007 | Johnson | 700/278 |
| 8,007,351 B1 * | 8/2011 | Maloney | 454/187 |
| 2001/0038787 A1 * | 11/2001 | Beck et al. | 414/537 |
| 2004/0020228 A1 | 2/2004 | Waldschmidt et al. | |
| 2005/0282485 A1 * | 12/2005 | Kato et al. | 454/136 |
| 2007/0077042 A1 * | 4/2007 | Jayaram et al. | 392/385 |

* cited by examiner

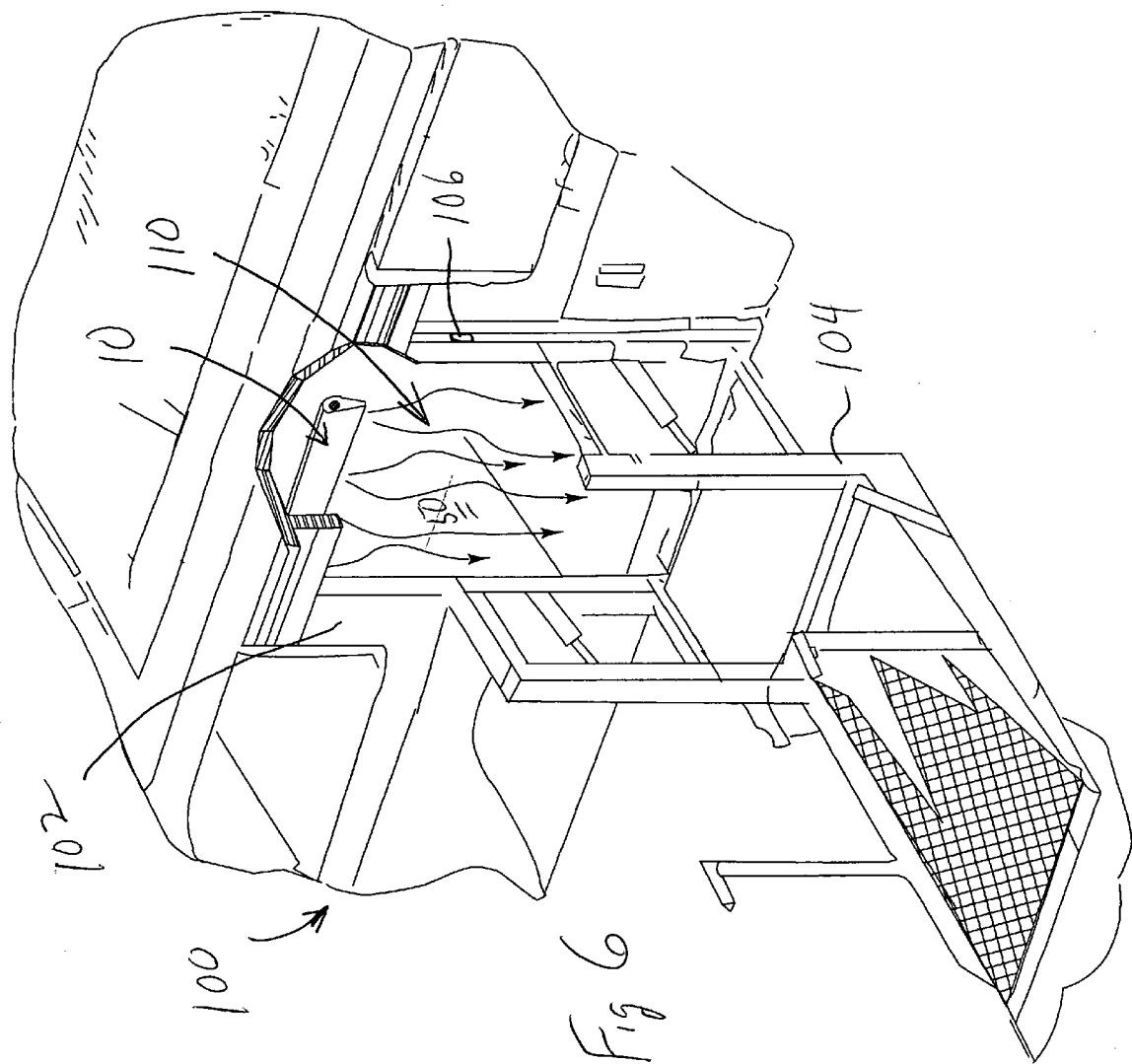

VEHICLE AIR WALL

CROSS-REFERENCE TO RELATED APPLICATIONS

This application is a Continuation in Part of U.S. patent application Ser. No. 12/148,680 filed Apr. 21, 2008, which claims priority to Provisional Patent Application Ser. No. 60/913,304 filed Apr. 23, 2007.

TECHNICAL FIELD

This invention relates to vehicles and in particular to maintaining a climate within the vehicle.

BACKGROUND OF THE INVENTION

Many vehicles, such as ambulances, define an interior space accessed from exterior the vehicle through an opening. In the case of an ambulance, the opening is typically at the rear of the ambulance and extends both in width and height a dimension close to the dimensions of the ambulance itself in order to provide easy access for patients on a stretcher, the emergency technicians and others. Of course, this opening is normally closed by the ambulance doors, permitting the climate of the interior space to be cooled or heated by the ambulance air conditioner or heater as the weather dictates. Unfortunately, the ambulance doors are often left open when picking up a patient at a residence or accident site and when delivering the patient to the hospital or doctor's office. When the doors are left open, the ambulance air conditioning or heating is typically not capable of delivering the desired comfort as the conditioned air simply flows to the outside through the opening. By failing to maintain the desired comfort level, all personnel in the ambulance suffer, and the patient's health may even be adversely impacted. Even if the climate can be maintained with the doors open, much energy is wasted, increasing fuel consumption and pollutants. A need exists to more efficiently maintain the desired climate in the interior space.

SUMMARY OF THE INVENTION

In accordance with one aspect of the present invention, an apparatus is provided for use with a vehicle, the vehicle having an interior space and an opening into the interior space, the device comprising a blower to generate an air flow and an air guide to direct the air flow across the opening to assist in maintaining a desired climate within the interior space. In accordance with another aspect of the present invention, the vehicle is an ambulance. The blower and air guide are mounted at the top of the opening in the ambulance and direct a wall of air downward over the opening to maintain the desired climate.

In accordance with another aspect of the present invention, the vehicle can be a food catering truck, another food related vehicle, people transport buses, such as a school bus, and boats.

BRIEF DESCRIPTION OF THE DRAWINGS

A more complete understanding of the invention and its advantages will be apparent from the following Detailed Description, taken in conjunction with the accompanying Drawings, in which:

FIG. 6 is a perspective view of the device incorporating the present invention mounted in a wheelchair bus.

DETAILED DESCRIPTION

Figure 2:
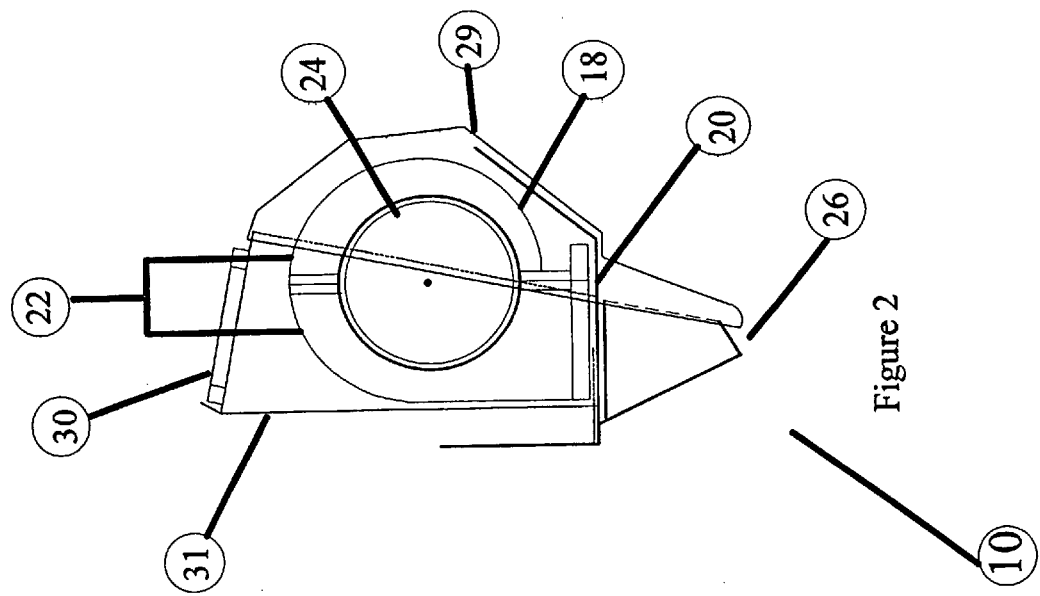
FIG. 2 is a side view of the device.

With reference now to the figures, FIGS. 1-5 illustrate a device 10 that can assist in maintaining the desired climate within an interior space 12 of a vehicle such as ambulance 14 despite the existence of a large opening 16 allowing access to the interior space. While the doors 15 of the ambulance 14 are normally closed over the opening 16 during transit, the doors are commonly left open when attending, loading and unloading the patient. This allows the accumulated air in the interior space 12 that has been cooled or heated to a desired temperature to simply escape.

Figure 1:
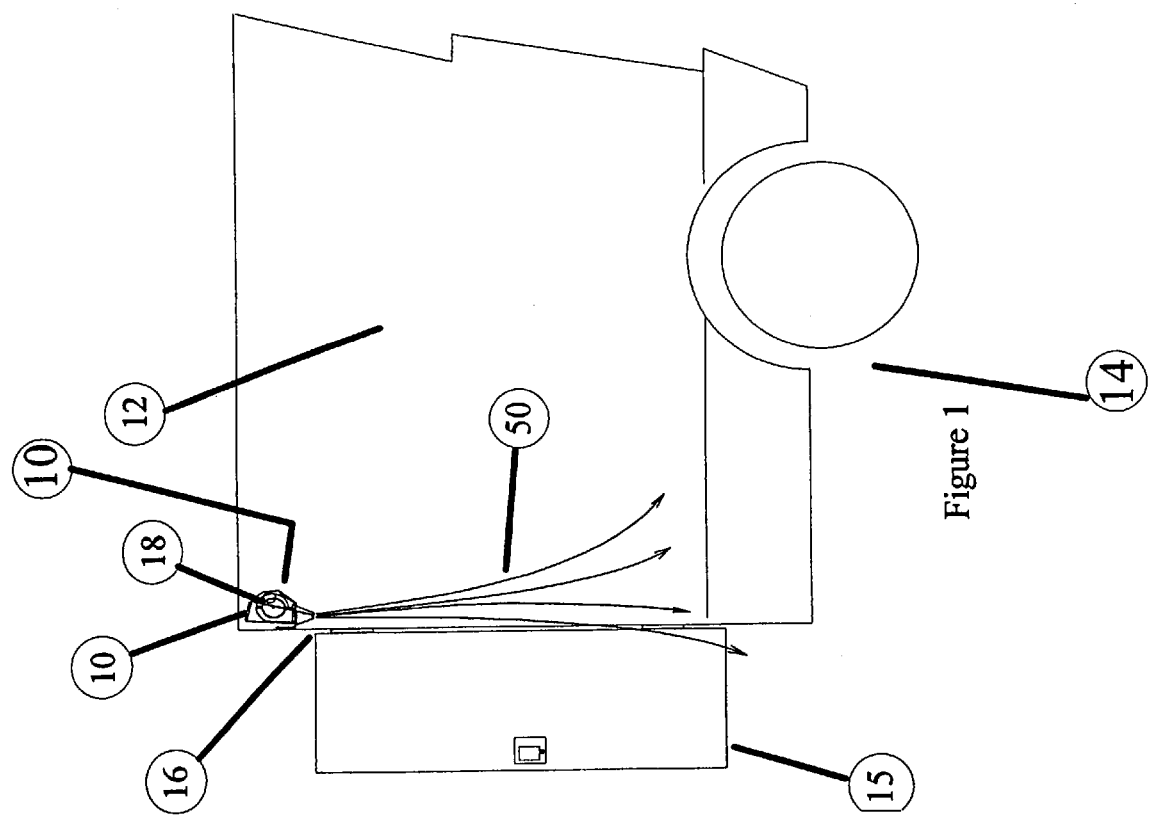
FIG. 1 is an illustration of a device incorporating the present invention mounted in an ambulance.

Device 10 creates a wall of air 50 across the opening 16 when the doors are open to resist escape of the conditioned air within the interior space 12. The device includes a blower 18 that generates positive air movement. The blower 18 is attached to a mounting plate 20 that directs the discharge of the blower 18 through slots 28 into a plenum defined between mounting plate 20 and a cover 29. A discharge slot 26 is formed between the mounting plate 20 and cover 29 and the air in the plenum is driven through the slot 26 to create wall of air 50 across the opening 16. In FIG. 1, the air flow is from the top to the bottom of the opening 16. However, the device 10 can be mounted to alternatively blow air across the opening 16 from side to side. This wall of air 50 resists escape of the air within the interior space 12 when the doors are open, reducing the requirements of the onboard air conditioning or heating systems components to maintain and achieve the desired interior temperature.

Figure 3:
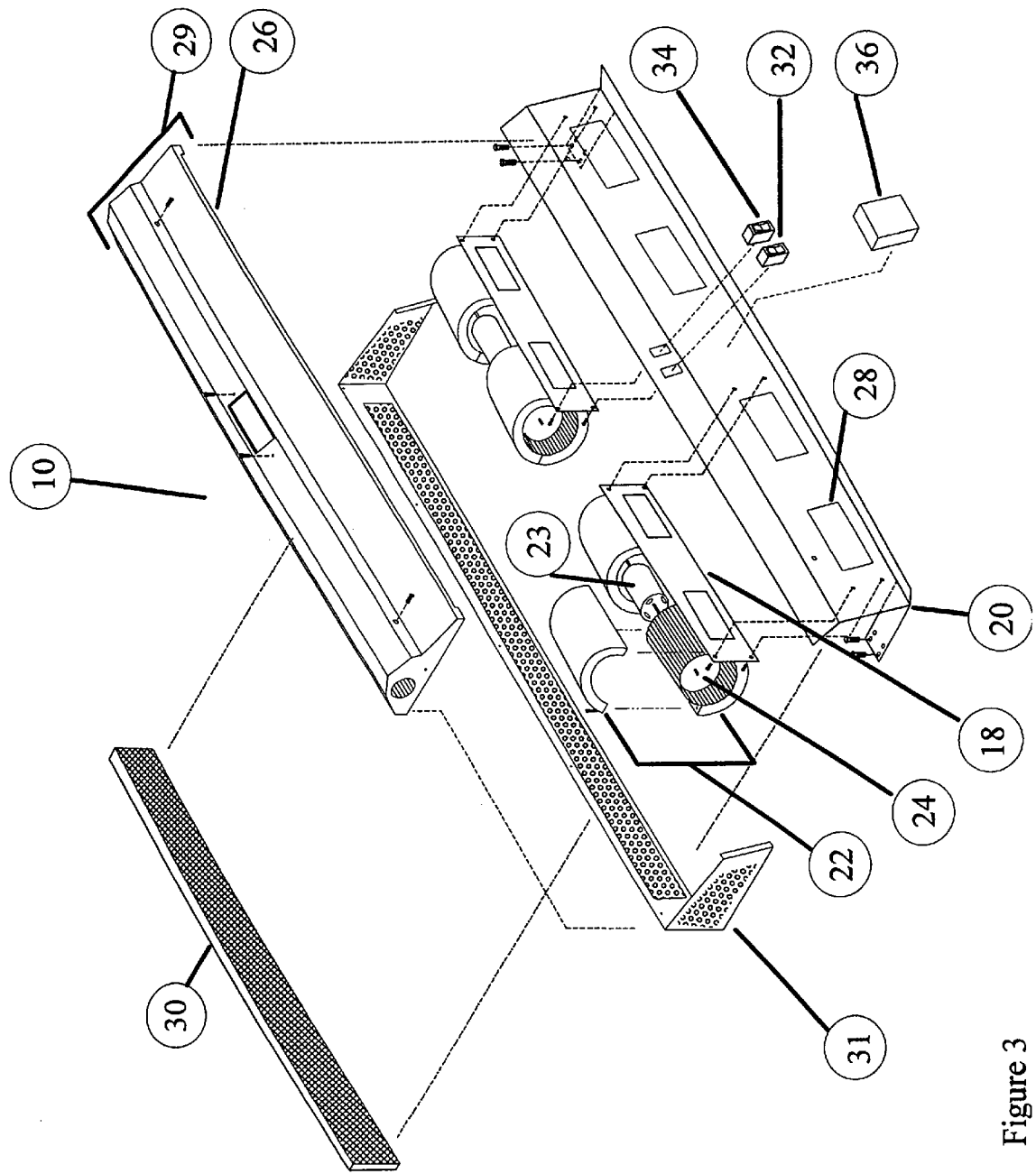
FIG. 3 is a top perspective view of the device.

As can be seen in FIGS. 2-3, the blower 18 is formed by two blower assemblies 22, each containing two squirrel cage blower wheels 24 to generate the air flow. The blower assemblies 22 each incorporate a motor 23 to drive blower wheels 24, powered by the electrical system of the ambulance or a power converter, typically at 12 Volts DC. The blower assemblies 22 are attached to the mounting plate 20, which can be seen to have a series of four rectangular slots 28, each in front of the discharge of a blower wheel 24.

The mounting plate 20 is used to mount the device 10 on the ambulance at the edge of the opening, preferably at the top of the opening as shown in FIG. 1. The mounting plate 20 cooperates with cover 29 to define a plenum and air slot 26 for discharging the air. A perforated panel 31, an air filter 30 and mounting plate 20 combine to define an air inlet plenum at the inlets of the blower wheels 24. The air filter 30 cleans the air as it flows into the panel 31 so that the air discharged from openings 28 is clean.

On hot days, the ambulance 14 air conditioning system is typically already working at its maximum capacity to maintain the temperature of the air in the interior space 12 at the desired temperature even with the ambulance doors 15 closed. At any emergency, loading or unloading of the patient, the doors are open, allowing the conditioned air within the interior space 12 to escape. By using device 10, a wall of air is generated across the opening 16, blocking escape of the cooler air in the interior space 12. Clearly, in cold weather, the device 10 will maintain the warmed air in the interior space 12.

Control of the device 10 will be designed to satisfy the particular demand. For example, the device can be switched on automatically if the doors are being opened, and stop when the doors are closed. A manual override can be used to allow the device to be switched on or off manually by the operator at any time. For example, a direct current controller 36 can be installed which is controlled by switch 32. In one position of switch 32, the device 10 is turned off. In another position of switch 32, the manual operation position, the direct current controller 36 applies power to operate the blower 18 continuously, until the switch 32 is moved from that manual operation position. In a third, automatic mode position of switch 32, the direct current controller 36 will react in response to input from door sensors, motion detection sensors or other various inputs. The door sensor can sense when a door of the ambulance opens, causing the blower 18 to operate continuously until the doors are again shut. The motion sensor 42 can be used to turn off the blower 18 when an object, like a stretcher, is approaching, even with the doors open. This can be particularly important if the patient is severely burned and should not be exposed to a jet of air. These sensors will determine the final output of the direct current controller 36, determining the operation of the device 10. The blower 18 can have multiple speeds, for example three speeds, to operate the device 10 to create an optimum condition. A three position switch 34 allows selection of the particular speed desired. An alternative switch 34 can also allow use of a variable speed configuration via the direct current controller 36 for precise airflow conditions.

The device 10 can also perform other functions. For example, the device 10 can be used for air circulation during travel of the vehicle. Many different types of air filter 30 can be used depending on the desired degree of filtration and purification of the air desired. The device 10 can be used solely as an air filter and purifier. For example, an ionizer or other product can be installed in device 10.

Figure 4:
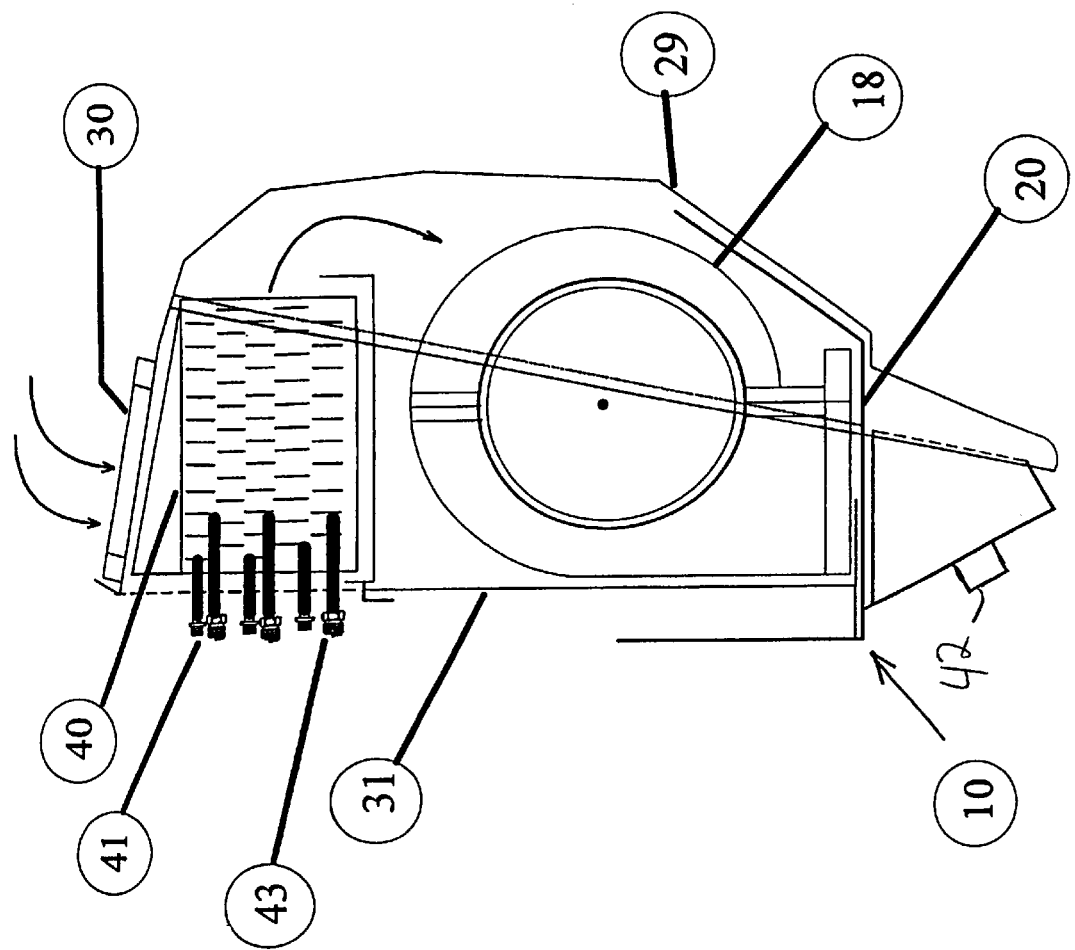
FIG. 4 is a side view of a second embodiment of the device.
Figure 5:
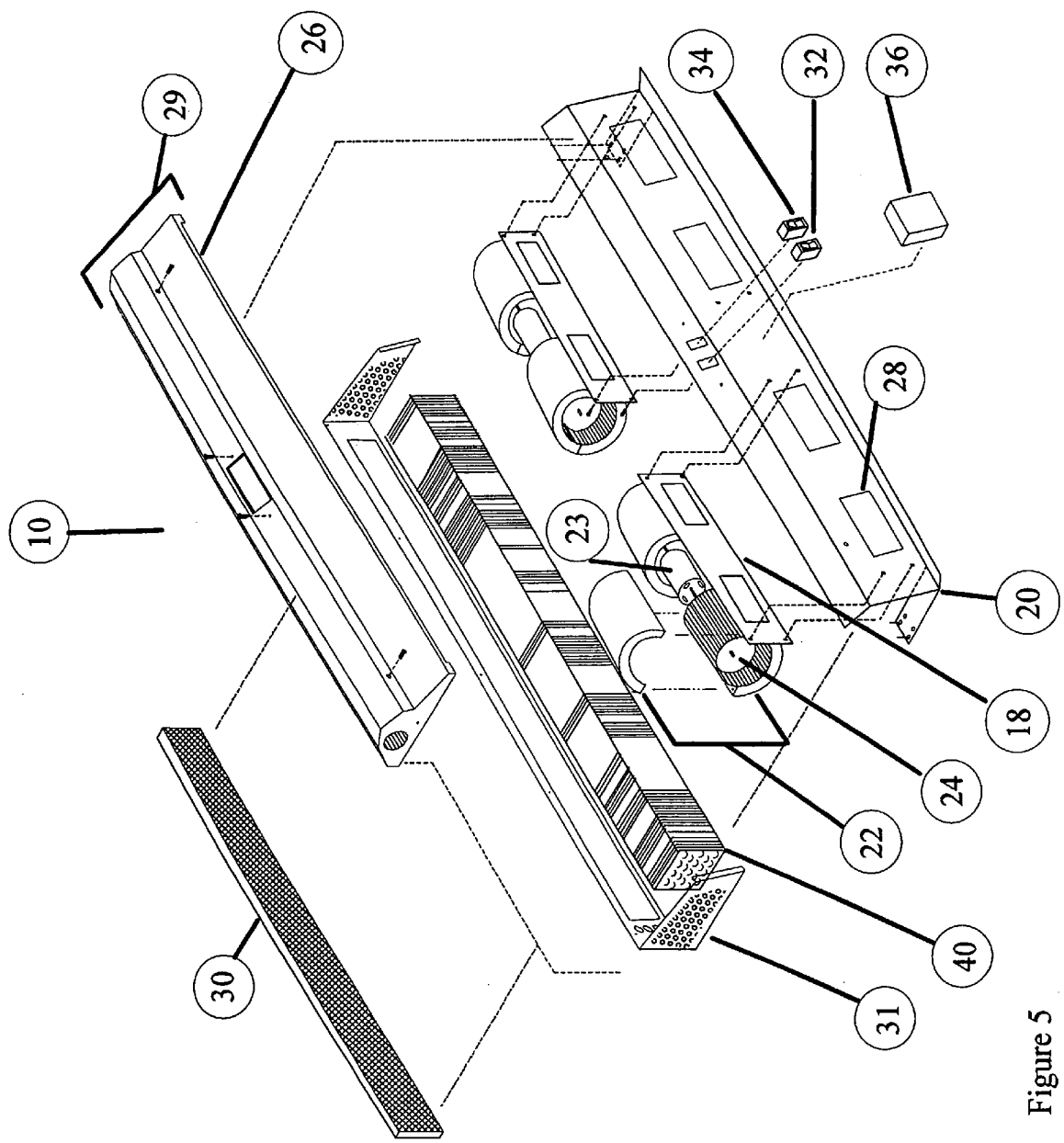
FIG. 5 is an exploded view of the device of FIG. 4.

As seen in FIGS. 4 and 5, the device 10 can also have an air conditioning evaporator coil 40 or a heater exchanger circuit 41, or both, installed therein. The device 10 with the addition of the cooling and/or heating circuits can be powered from the vehicle's onboard 12 volt DC heating and cooling system, as well as an onboard 115 volt AC heating and cooling circuit 43. This would provide for positive cooling or heating of the air in the plenum before discharge from the device 10. Some applications may require emergency cool down. In such a case, the device 10 can incorporate cryogenic gases or fluids in a primary or secondary cooling loop. A glycol based or similar type solution combined within an evaporator coil 40 in device 10 will rapidly cool the air either as a primary cooling system or secondary cooling system working with the existing onboard cooling system.

While the device 10 has been described for use in an ambulance 14, the device can be used in many different types of vehicles, including many in the automotive industry. For example, food and perishable goods type vehicles, food catering trucks and all other food related vehicles, which typically have an interior space that is to be kept cool or hot but which uses one or more large openings to access the food stored therein. Another example is transport buses and personnel carriers as well as school buses, where frequent stops are made. More and more school buses are being air conditioned. However, the front door of a bus is constantly being opened to load and unload students, resulting in significant losses of the conditioned air within the bus. Since most school buses are of minimal horsepower with the engine located in the front of the chassis, the air conditioning compressors typically used are not powerful enough to adequately cool the bus. By use of a device 10 at the front door of the bus, which can come on each time the door is opened, the cooling present inside the bus can be maintained, as operation is automatic each time the door is opened. Military vehicles and all types of aircraft with temperature sensitive equipment can benefit from the device 10. Boat cabins could also benefit from the use of device 10. Many other applications are possible.

For example, FIG. 6 illustrates a wheelchair bus 100 that incorporates a device 10. The bus 100 has a door 102 which normally closes over the door opening 110, but which opens to allow a wheelchair platform 104 to deploy from the interior of the bus 100 to a loading position as seen in FIG. 6. The platform can be lowered to the ground level to receive or discharge a wheelchair. While loading or unloading a passenger in a wheelchair, the door 102 clearly stands open and conditioned air within the bus 100 can escape through the door opening 110 when not using device 10. The loading or unloading time of a single passenger from a bus 100 requires approximately 10 to 20 minutes.

The device 10 is mounted above the door 102 as seen in FIG. 6 and directs a wall of air 50 downward over the area of the door opening 110 to resist the escape of conditioned air from within the bus 100 while it is loading and unloading. The device 10 is adapted to the roofline of the bus 100 and avoids other mechanical obstructions such as door hinges, electrical wiring and hydraulic lines.

It is believed the standard performance capability of the electrical system of the bus 100 need not be upgraded when using device 10. This can avoid the need to install a larger alternator, for example. To achieve this result, it is recommended to reduce the air conditioning air blowers to low speed when using device 10. This is believed to allow the device 10 to perform with greater efficiency. This is believed due to less air turbulence within the bus 100 created by the bus air conditioning air blowers when the doors 102 are opened. The device 10 will be turned on at the same time the air conditioning air blowers are changed automatically to low speed operation, reducing the amperage requirement enough for the device 10 to operate within the standard vehicle specifications of bus 100. For example, a switch 106 can be mounted at door 102 to sense when it opens. This switch 106 would automatically turn the air conditioning air blowers to low speed and activate device 10 when the door 102 opens.

A substantial benefit of the invention is vehicle fuel savings. As noted, the operation of the air conditioner in a vehicle requires use of the engine to drive the air conditioning compressor. The compressor produces heat and pressure in the air conditioning cycle. The horsepower requirement of the compressor is relevant to the pressure that directly relates to the inside ambient temperature of the vehicle. Higher inside ambient temperatures result in higher operating pressures for the compressor. High compressor operating pressures impose a greater horsepower requirement for the engine, resulting in increased fuel consumption and higher operating temperatures for the engine. Thus, reduction of outside ambient air moving into the interior of a vehicle by using device 10 will directly reduce pressure and fuel consumption, as well as increase the life of other engine and air conditioning components.

In high humidity conditions, the vehicle air conditioning system requires a large percentage of its capacity to dehydrate the air instead of cooling the air. Device 10 will greatly reduce entry of humid outside air, reducing the workload of the air conditioning system and creating a healthier environment. Dust and insect entry into a vehicle using device 10 is also greatly reduced.

As the wheelchair passenger is unloaded from bus 100, the door 102 remains open for an extended period of time, the air conditioner onboard will see an increase in heat, pressure, and fuel consumption due to the outside air influence, unless device 10 is used. The same advantages of device 10 can be realized by installing device 10 in city busses, school buses, shuttle buses and other frequent stop transportation vehicles, including passenger train cars.

As an example, city buses and similar vehicles are equipped with high performance air conditioning systems. During frequent stops, open doors, loading and unloading passengers, the cool air will escape rapidly, thus the air conditioning system of the vehicle has to operate continuously at its highest capacity. However, even so, it never reaches the desired comfort zone. Many buses, having two doors front and rear when open, even create a draft between these two doors, further depleting the cool air. This can be very uncomfortable for the passengers. Use of device 10 in the vehicle reduces the load on the air conditioning system and elevates comfort levels.

Another application for device 10 is a recreational vehicle. Recreational vehicles are often parked at their destination and experience high in and out activity. The doors in many cases are left open, resulting in an uncomfortable situation and high stress on the air conditioning system. Use of device 10 in the recreational vehicle would reduce load on the air conditioning system and elevate comfort levels.

In a recent newscast, a Dallas, Tex., school district was reported to have received complaints of toxic exhaust fumes accumulating inside school buses during frequent stops. The level of carbon monoxide accumulation inside of these buses is high enough to warrant replacement of the entire engine assembly with a more modern lower emission standard engine assembly to help control the problem. The cost of such an engine change out program is enormous.

Use of the device 10 in a vehicle will also provide a reduction of exhaust entering the vehicle as well as help retain the heating and cooling values established in the interior of the vehicle. The device 10 helps to not only resist the loss of conditioned air from within the vehicle, but also resists the entry of outside air which can be laden with exhaust fumes.

Wheelchair buses operating side or rear doors that are opened for extended periods will benefit from device 10. Airport shuttle buses parking along side other vehicles producing toxic emissions will benefit from device 10 reducing toxic fumes entering the vehicle. Ambulances typically have rear opening doors located near the exhaust discharge and will benefit from use of device 10 in reducing toxic fumes entering the ambulance. Any type of vehicle on a scheduled route will benefit from use of device 10 to reduce toxic fumes from entering the vehicle.

An ambulance using a device 10 would receive great benefit in reducing the hazards of exhaust entering the ambulance through the open rear doors. When an ambulance is on scene, the parking brake is set and the engine automatically enters a "high idle mode" running at 1500-1700 RPM. This is done to keep the electrical output of the vehicle at a maximum value, as well as air-conditioning. At this high idle, even more toxic exhaust fumes are generated then would be created at regular idle. Even though large amounts of exhaust fumes are created, it is still typical for the rear doors of the ambulance to be left open at the scene. The use of device 10 will limit the entry of outside pollutants, such as toxic exhaust fumes, into the interior of the vehicle, by creating the air wall that resists movement of outside air into the interior of the vehicle, creating a healthier environment within the vehicle.

While several embodiments of the present invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

The invention claimed is:

1. An apparatus for use with an ambulance, the ambulance having an interior space with an opening at the rear of the ambulance, the apparatus comprising:
   an air curtain apparatus having a blower to generate an air flow, the blower mounted to the ambulance at an edge of the opening, the blower having an air input drawing air from the interior space of the ambulance and an air output;
   an air guide to direct the air flow from the output of the blower across the opening to assist in maintaining a desired climate condition of temperature and humidity in the interior space and limiting the entry of exhaust fumes from the exhaust of the ambulance, the air guide mounted to the ambulance at the edge of the opening;
   an air filter to filter the air in the air flow;
   a controller providing power to the blower to operate the blower;
   a motion detection sensor providing input to the controller, the controller ceasing operation of the blower upon the motion detection sensor sensing an object approaching the opening;
   a mounting plate and a cover, the blower mounted to the mounting plate;
   a perforated panel, the perforated panel, air filter and mounting plate defining an air inlet plenum, air being drawn from the interior space into the air inlet plenum;
   a heating and air conditioning system in the ambulance to heat and cool the interior space of the ambulance;
   a heat exchanger circuit and/or an air conditioning evaporator coil to heat or cool the air to supplement the heating and air conditioning system in the ambulance; and
   the blower, coil and/or heat exchanger circuit are positioned within a volume defined by the mounting plate, cover, perforated panel and air filter at the edge of the opening.

2. The air curtain apparatus of claim 1 wherein the air guide is mounted to the ambulance to direct air flow downward from the top of the opening.

3. The air curtain apparatus of claim 1 wherein the ambulance has at least one door at the opening sized to receive a stretcher, opening the door activating the blower to generate the air flow.

4. The air curtain apparatus of claim 1 further comprising a manual switch to turn on the blower, the blower turned on during travel of the ambulance for filtration and purification of the air within the interior space.

5. The air curtain apparatus of claim 1 wherein the air curtain apparatus forms a wall of air across the opening with the air flow.

6. The air curtain apparatus of claim 1 wherein the blower has variable speeds to vary the air flow.

7. The air curtain apparatus of claim 1 wherein the air flow resists entry of outside pollutants into the interior space of the ambulance.

8. The air curtain apparatus of claim 1 wherein the vehicle has a heating system to heat the interior space of the vehicle, the air curtain apparatus further comprising a heat exchanger circuit to heat the air, the heat exchanger mounted to the ambulance at the edge of the opening to supplement the heating system in the vehicle.

9. An apparatus for use with an ambulance, the ambulance having an interior space with an opening at the rear of the ambulance, the apparatus comprising:

an air curtain apparatus having a blower to generate an air flow, the blower mounted to the ambulance at an edge of the opening, the blower having an air input drawing air from the interior space of the ambulance and an air output;

an air guide to direct the air flow from the output of the blower across the opening to assist in maintaining a desired climate condition of temperature and humidity in the interior space and limiting the entry of exhaust fumes from the exhaust of the ambulance, the air guide mounted to the ambulance at the edge of the opening;

an air filter to filter the air in the air flow;

a controller providing power to the blower to operate the blower;

a motion detection sensor providing input to the controller, the controller ceasing operation of the blower upon the motion detection sensor sensing an object approaching the opening;

a mounting plate and a cover, the blower mounted to the mounting plate;

a perforated panel, the perforated panel, air filter and mounting plate defining an air inlet plenum, air being drawn from the interior space into the air inlet plenum;

the mounting plate having slots, the air discharge from the blower passing through the slots;

the air guide being a discharge slot defined between the mounting plate and the cover; and the mounting plate directly mounted to the ambulance at the edge of the opening.

10. An ambulance, the ambulance having an interior space and an exhaust for engine combustion exhaust fumes at the rear of the ambulance, comprising:

structure defining an opening at the rear of the ambulance opening into the interior space;

at least one door movable between an open position and a closed position, the door in the open position permitting passage through the opening into the interior space, the door in the closed position closing the opening;

a heating and air conditioning system to heat and cool the interior space of the ambulance;

an apparatus for use with the ambulance, the apparatus comprising:

an air curtain apparatus having a blower to generate an air flow, the blower mounted to the ambulance at an edge of the opening, the blower having an air input drawing air from the interior space of the ambulance and an air output;

an air guide to direct the air flow from the output of the blower across the opening to assist in maintaining a desired climate condition of temperature and humidity in the interior space and limiting the entry of exhaust fumes from the exhaust of the ambulance, the air guide mounted to the ambulance at the edge of the opening;

an air filter to filter the air in the air flow;

a controller providing power to the blower to operate the blower;

a motion detection sensor providing input to the controller, the controller ceasing operation of the blower upon the motion detection sensor sensing an object approaching the opening;

a mounting plate and a cover, the blower mounted to the mounting plate;

a perforated panel, the perforated panel, air filter and mounting plate defining an air inlet plenum, air being drawn from the interior space into the air inlet plenum;

a heat exchanger circuit and/or an air conditioning evaporator coil to heat or cool the air to supplement the heating and air conditioning system in the ambulance; and the blower, coil and/or heat exchanger circuit are positioned within a volume defined by the mounting plate, cover, perforated panel and air filter at the edge of the opening.

11. The ambulance of claim 10 wherein the ambulance is operated in high idle mode between 1500-1700 rpm, the air flow limiting the entry of exhaust fumes while the ambulance is operated in high idle mode.

* * * * *